March 19, 1940.          S. A. MOREHOUSE                2,194,029
                              REEL SEAT
                         Filed Jan. 8, 1938
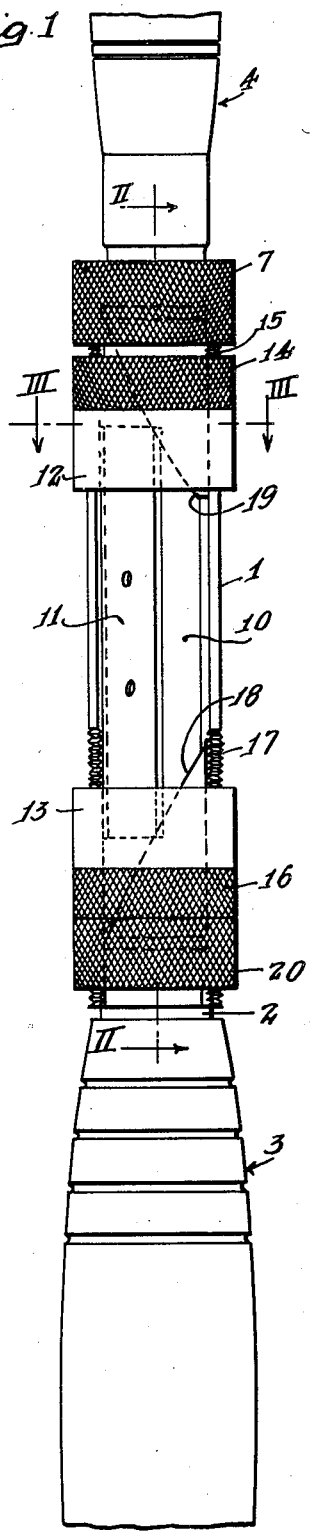
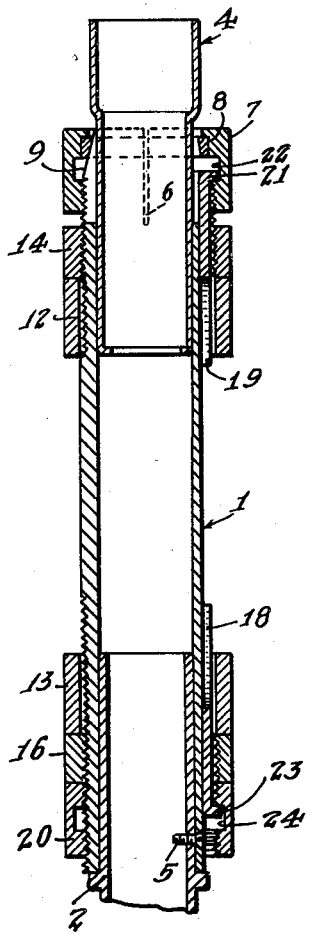
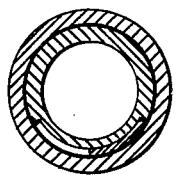
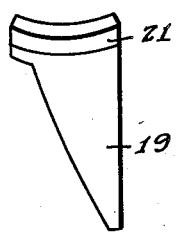
Inventor
Silas A. Morehouse
By Lyon & Lyon
Attorneys Patented Mar. 19, 1940

2,194,029

UNITED STATES PATENT OFFICE 2,194,029

REEL SEAT

Silas A. Morehouse, Glendale, Calif., assignor of one-half to George A. Sailer, Glendale, Calif.

Application January 8, 1938, Serial No. 183,997

7 Claims. (Cl. 43—22)

This invention relates to reel seats, such as are used on fishing rods, for the purpose of anchoring a reel thereto.

A general object of the invention is to provide a reel seat that will very firmly and positively anchor reels having bases of varying widths to a rod.

It is old to construct reel seats with a longitudinal slot or groove therein for receiving a reel base with clamping elements adapted to slip over the ends of the reel base. The clamping elements firmly restrain the reel base against radial movement outwardly away from the reel seat but the reel base is usually not positively secured against circumferential movement about the seat unless the width of the reel base is such as to cause it to fit snugly in the slot or groove in the reel seat. Hence when employing a reel seat of the type described with any reel having a base narrower than the width of the groove in the reel seat, the reel is apt to twist on the rod and such seats are satisfactory only with reels having bases of a particular width to fit the seat.

In accordance with the present invention I provide a reel seat of the type referred to having, in addition to clamping means for restraining the ends of the reel base against radial movement, wedges for wedging between the edge of the reel base and the shoulder at the edge of the groove in the reel seat so that circumferential movement of the reel base on the reel seat is positively prevented when using reels having bases of narrower width than the groove in the reel seat.

Other more important objects and features of the invention will become apparent from the detailed description which follows, of a specific embodiment of the invention, it being understood that various changes can be made from the particular structure shown without departing from the invention.

In the drawing:

Fig. 1 is an elevational view of a reel seat in accordance with the invention shown inserted in a fishing rod;

Fig. 2 is a longitudinal sectional view through the reel seat, taken approximately in the plane II—II of Fig. 1;

Fig. 3 is a cross section, taken in the plane III—III of Fig. 1; and

Fig. 4 is a perspective view of one of the wedge elements employed in the seat.

Referring to the drawing, the reel seat therein disclosed comprises a tubular body member 1 adapted to receive at its lower end a ferrule 2 on the end of a butt or handle 3 and receive at its upper end the rear end of a fishing rod or pole 4 in the conventional manner. As shown in Fig. 2, the butt 2 may be secured within the body member 1 by a set screw 5. The lower end of the fishing rod 4 has a slip-fit within the upper end of the body member 1. To firmly anchor the end of the rod 4 within the upper end of the body member 1 the upper end of the latter is provided with a plurality of circumferentially spaced slots 6 and a nut member 7 threaded on the upper end of the body 1 is provided with an inwardly extending shoulder 8 which seats against the tapered end portion 9 on the body member 1. When the nut member 7 is turned down tightly it forces the ends of the body member 1 tightly about the end of the fishing rod 4.

For the purpose of supporting a reel base, the body member 1 is provided with a longitudinal groove 10 extending from end to end thereof, this groove extending through the threaded portion at the upper end of the member 1, thereby interrupting the threads thereon, and also extending through and interrupting other threads on the lower end of member 1. In Fig. 1 a base 11 of a reel is shown positioned in the groove 10 and secured against radial movement outwardly from the groove by a pair of retaining rings 12 and 13, respectively, which loosely encircle the body member 1 and can be slipped over the ends of the reel base 11 (which is usually tapered from a greater thickness at the middle to a lesser thickness at the ends) to tightly engage it. The ring 12 is forced over one end of the reel base 11 by a nut 14 engaging the threads 15 on the body member 1 and the ring 13 may be restrained from longitudinal movement away from the reel base 11 by a similar nut 16 engaging the threads 17 on the other end of body member 1. In practice, one of the nuts 16 or 14 can be left in a substantially permanent location and adjustment made to permit attachment or removal of a reel by manipulation of the other nut alone.

It will be observed from Fig. 1 that the reel base 11 is much narrower than the groove 10 and therefore might have a tendency to move circumferentially from one side to the other of the groove 10. In accordance with the present invention, I positively prevent any such action by providing at the opposite ends of the groove 10 a pair of wedges 18 and 19, respectively. These wedges are curved to correspond with the curvature of the floor of the groove 10 and have a thickness substantially the same as or slightly less than the depth of the groove 10 so that they can move longitudinally within the groove below the nuts 14 and 16. To control the longitudinal movement of the wedges 18 and 19 they are connected to nuts 20 and 7, respectively. Thus the wedge 19 is provided at its upper end with an outwardly extending flange 21 which engages an annular groove 22 within the nut 7. Likewise the wedge 18 is provided on its lower edge with an outwardly extending flange 23 engaging an annular groove 24 in the nut 20. It will be apparent, therefore, that in response to rotation of nut 7 wedge 19 will be advanced or retracted within the groove 10 and similarly, by rotating the nut 20 the wedge 18 will be advanced or retracted in the groove 10. This makes it possible to shift the wedges 18 and 19, or either of them, until they engage the two corners at the two ends on one side of the reel base 11, thereby preventing any possible circumferential movement of the reel base 11 within the groove 10. Of course the wedges 18 and 19, when moved into locking engagement with the reel base 11, also prevent any possible longitudinal movement of the latter. As previously indicated, outward or radial movement of the reel base is prevented by the rings 12 and 13 which are moved into locking engagement with the outer surfaces of the reel base by the nuts 14 and 16.

It will be observed, with reference to Fig. 1, that the diagonal left edge of the wedge 19 and the juxtaposed portion of the left marginal wall of the groove 10, constitute one pair of converging surfaces for engaging the edges of the reel base at the upper end thereof, and the diagonal left edge of the wedge 18 and the juxtaposed portion of the left marginal wall of the groove 10. also define a pair of converging surfaces for engaging the edges of the reel base at the lower end thereof.

In use, it is ordinarily not necessary to disturb the nuts at both ends of the reel seat. Thus in some instances the nuts 16 and 20 at the butt end of the reel seat may be left in a fixed position at all times. Under these circumstances, to attach a reel, the nuts 7 and 14 are backed off a sufficient distance to permit insertion of the reel base 11 in the groove 10, and it is positioned against one edge of the groove, as shown, with one lower corner against the wedge 18. Then the nuts 7 and 14 may be run down simultaneously until the wedge engages the upper corner of the reel base 11, after which the nut 14 may be turned independently of the nut 7 until the ring 12 is firmly engaged against the upper end of the reel base 11. The nut 16 may then be rotated independently of the nut 20 to advance the ring 13 into tight engagement with the lower end of the reel base. After the nut 16 has been once set in position with respect to any particular reel base, it need not thereafter be moved.

Although the invention has been explained by describing in detail a preferred embodiment thereof, various changes may be made in the exact structure shown without departing from the invention, which is to be limited only to the extent set forth in the appended claims.

I claim:

1. A reel seat comprising a tubular member having a longitudinal groove in its outer surface for receiving the base of a reel, means for engaging the ends of a reel base positioned in said groove and preventing movement of said base outwardly of the groove, wedge means positioned within said groove, and means for wedging said wedge means between a reel base in said groove and one edge of said groove, and bridging the gap between said reel base and said one edge of said groove, whereby circumferential movement of the reel base within the groove is prevented.

2. In combination, a reel seat comprising a tubular member having a longitudinally disposed groove in its outer surface, a reel base positioned in said groove, ring means on said tubular member for overlapping and engaging the ends of the reel base for restraining the latter against outward movement, means for locking said ring members against longitudinal movement of the ends of said reel base, wedge means in said groove interposed between one edge of the groove and one corner of said reel base, and means for fixing said wedge means in position of longitudinal adjustment with respect to said tubular member.

3. In combination, a fishing reel seat comprising a tubular member having a threaded end, a longitudinal groove in the exterior surface of said tubular member for receiving a reel base, ring means for overlapping the ends of the reel base positioned in said groove, and securing the reel base against outward movement with respect to the groove, nut means cooperating with said threaded portion of said tubular member for locking said rings in position of longitudinal adjustment, wedge means in said groove interposed between one edge of said groove and said reel base, disposed therein, and movable longitudinally into wedging relation between the edge of said groove and said reel base, and additional nut means engaging the threaded portion of said tubular member connected with said wedge means for anchoring said wedge means in various positions of longitudinal adjustment.

4. In combination, a fishing reel seat comprising a tubular member threaded exteriorly at both ends and having a groove in its outer surface for receiving a reel base, ring means encircling said tubular member and movable longitudinally thereon into overlapping relation with the ends of a reel base in said groove, a pair of nut means engaging the respective threaded portions of said tubular member for independently longitudinally adjusting the said two rings, wedge means in said groove adapted to wedge between one edge of the groove and the opposite ends of a reel base positioned therein, and an additional nut means engaging the threaded portion of said tubular member at one end thereof for longitudinally adjusting the wedge means at that end independently of the other nut means at that end of the tubular member.

5. A device as defined in claim 4, in which one end of said tubular member is slotted for contraction about the end of a fishing rod connected therewith and said nut means for longitudinally supporting the wedge means at that end of the tubular member, having a shoulder thereon adapted to compress the slotted end of said tubular member about a fishing rod when said nut is tightened.

6. In combination, a reel seat comprising a tubular member having a longitudinally disposed groove in its outer surface, said groove having a bottom surface concentric with respect to the surface of said tubular member and having distinct edge surfaces, a reel base positioned in said groove, means on said tubular member for overlapping and engaging the ends of the reel base for restraining the latter against outward movement, and means in said groove movable into positon wedged between one edge of the groove and said reel base, and bridging the gap between said reel base and said one edge of said groove, for restraining said reel base against circumferential movement within said groove.

7. A reel seat comprising a tubular member having a surface to receive the base of a reel, means for engaging the ends of a reel base positioned against said surface and preventing movement of said base outwardly away from the surface, means defining a pair of converging surfaces for engaging the edges of the reel base at one end thereof and preventing circumferential movement of that end of said base with respect to said tubular member, and means at the opposite end of said base defining a pair of converging surfaces, at least one of which is movable, for engaging the edges of said reel base at the said opposite end and preventing circumferential movement of the last-mentioned end of the reel base with respect to said tubular member.

SILAS A. MOREHOUSE.